US006104273A

United States Patent [19]

Larranaga et al.

[11] Patent Number: 6,104,273

[45] Date of Patent: Aug. 15, 2000

[54] CALIBRATION ASSEMBLY AND PROCESS FOR USE IN A CIRCUIT PROTECTIVE DEVICE

[75] Inventors: Javier Larranaga, Bristol; Joe Criniti, New Britain, both of Conn.

[73] Assignee: General Electric Company, Schenectady, N.Y.

[21] Appl. No.: 09/328,777

[22] Filed: Jun. 9, 1999

[51] Int. Cl.[7] .......................... H01H 73/00; H01H 73/48; H01H 75/12; G01N 25/34

[52] U.S. Cl. .................................. 337/82; 337/3; 337/13; 337/38; 337/45; 337/59; 200/286; 335/35; 335/45; 335/145; 335/176; 374/1; 374/205

[58] Field of Search ................................... 337/82, 94, 1, 337/3, 12–14, 35–38, 45, 59, 112, 113, 360; 200/400, 401, 293, 303, 286; 335/23, 35, 37, 43, 45, 145, 172, 173, 176; 374/1, 2, 121, 130, 132, 205

[56] References Cited

U.S. PATENT DOCUMENTS

| | | | |
|---|---|---|---|
| 3,566,327 | 2/1971 | Gryctko | 337/77 |
| 3,806,847 | 4/1974 | Salvati | 335/176 |
| 3,815,064 | 6/1974 | Maier et al. | 335/176 |
| 3,908,110 | 9/1975 | Heft | 219/121 LM |
| 3,944,959 | 3/1976 | Kidd | 337/82 |
| 3,950,714 | 4/1976 | Mrenna et al. | 335/35 |
| 3,953,812 | 4/1976 | Heft et al. | 335/23 |
| 4,326,183 | 4/1982 | Tharp | 337/70 |
| 4,630,019 | 12/1986 | Maier et al. | 37/70 |
| 4,719,438 | 1/1988 | Mrenna et al. | 335/38 |
| 4,825,186 | 4/1989 | Bayer | 37/360 |
| 4,947,122 | 8/1990 | Ruemenapf et al. | 324/417 |
| 5,317,471 | 5/1994 | Izoard et al. | 361/105 |
| 5,381,120 | 1/1995 | Arnold et al. | 335/35 |
| 5,392,016 | 2/1995 | Arnold et al. | 335/176 |
| 5,579,901 | 12/1996 | Faber et al. | 200/401 |
| 5,680,081 | 10/1997 | Scheel et al. | 335/16 |
| 5,718,328 | 2/1998 | Faber et al. | 200/401 |
| 5,821,839 | 10/1998 | Heise et al. | 335/35 |
| 5,894,259 | 4/1999 | Kolberg et al. | 337/333 |
| 6,030,114 | 2/2000 | DiMarco et al. | 374/1 |

FOREIGN PATENT DOCUMENTS

| | | | |
|---|---|---|---|
| 3619240 | 12/1987 | Germany | H01H 73/18 |
| 2228829 | 9/1990 | United Kingdom | H01H 71/16 |

*Primary Examiner*—Leo P. Picard
*Assistant Examiner*—Anatoly Vortman
*Attorney, Agent, or Firm*—Cantor Colburn LLP; Carl B. Horton

[57] ABSTRACT

In an exemplary embodiment of the invention, a calibration arrangement and process for use in a circuit protective device are presented. An exemplary calibration assembly for use in the calibration process of the present invention includes a split clamp arm having a first opening for receiving and holding a calibration pin and a second opening for receiving an actuator key. A portion of the split clamp arm is divided into a first arm and a second arm by a channel which extends from a first end of the split clamp arm through the first opening and communicates with the second opening. The split clamp arm is opened by inserting the actuator key through the second opening and because of the preferred oblong or rectangular shape of the second opening of the split clamp arm, rotation of the actuator key therein forces the members forming the first opening of the split clamp arm apart from one another. As a result, the calibration pin is free to float (move) within the first opening and the calibration assembly may be set.

17 Claims, 6 Drawing Sheets

CALIBRATION ASSEMBLY AND PROCESS FOR USE IN A CIRCUIT PROTECTIVE DEVICE

BACKGROUND OF THE INVENTION

Presently, most circuit protective devices (single phase or multi-phase) are constructed in a manner that if an over-current condition should occur in a phase, the mechanism will automatically open all phases. In most cases, fault detection will bring about automatic tripping in an "instantaneous" or a "time delay" basis. The "time delay" tripping occurs when the level of over-current is not excisable high, and is an action which is controlled by a bimetallic member heated by energy which is a function of the current flowing through the particular phase in which the bimetallic member is located. Typically, the bimetallic is disposed adjacent to a conductor and is intended to sense heat. The heat deflects the bimetallic and as the bimetallic deflects a predetermined distance, it engages a trip mechanism causing contacts to separate and interrupt the flow of current in the circuit breaker.

An individual bimetallic member is provided for each phase of a circuit protective device. One conventional calibration arrangement for "time delay" tripping provides for a calibration screw mounted directly on the trip bar or on the bimetallic member itself. During the calibration process, the actuation of this calibration screw provides the means of creating the appropriate distance in between the bimetallic member and the trip mechanisms to allow the bimetallic member to deflect when heated by energy for a period of time before tripping the phase.

However, this process of calibration and particularly, the adjustment of the calibrating screw, often applies additional load to the tripping means. This force introduces uncontrolled loads providing inconsistency and unpredictable results in the operation of the trip mechanism. Also, calibration varies due to changes in trip bar loads or in calibration forces.

In addition, it is very difficult to select and feed calibration screws reliably in automation because usually the features at both ends of the headless screw are very similar. Yet one end serves a completely different functional purpose in the calibration assembly. For example, most calibration screws for circuit protective devices have a rounded end at one end to serve as a pivot point and a drive feature, such as a slot or socket, at the opposite end to permit the calibration screw to be manipulated. Because both ends are very similar in terms of screw shape and cross section, the automation device has a hard time consistently detecting the front of the calibration screw from the back. As a result, sometimes, the calibration screw is inserted backwards.

Calibration of a molded case circuit protective device provides the means to set the device so that the device meets the manufacturer's advertised trip curves of percentage rated current vs. time. A common method of calibrating a circuit protective device is called cold calibration. This process permits for adjusting the position of the calibrating screw to the bimetallic member without the initial utilization of current (to deflect the bimetallic member) being applied to the phases as a means to set the bimetallic member to trip unit distance (gap). In the cold calibration process, the device under test must be first set to an "ON" position where the mechanism is charged and the breaker contacts are closed to provide a continuous path from the line to the load end of the device. The calibration s screw is then engaged and driven until it actually trips the mechanism, thus opening the contacts and braking the continuous path. Usually, upon actuation of the trip mechanism, the circuit protective device will trip and a pair of separable contacts will separate causing the current interruption in the circuit protective device. At this point, the calibration screw is reversed for a preset number of turns (the distance is based on the amount of threads per inch on the calibration screw). At this point, a distance is set and the initial cold calibration process must be now rechecked by charging the trip mechanism back to the "ON" position and applying a percentage of the rated current to the phase(s) until the unit trips as a result of bimetal deflection. Typically, the percentage of rated current applied to the device at this point will be from about 200% to about 400%. The time that elapsed for the circuit protective device to trip at this percentage current must fall within the parameters or "window" specified in the trip curves. If the device took too long to trip, an adjustment must be made to the calibration screw to adjust the present gap. An adjustment to the calibration screw must also be done if the device tripped too early. This adjustment will be done in the opposite direction. After this adjustment has been accomplished, usually the device is tested again to confirm the accuracy of the prior adjustments.

Another method utilized for calibration of circuit protective devices is the so called hot calibration process. The hot calibration differs from cold calibration because it puts the device under current conditions throughout the process. The standard practice for hot calibration provides for a calibration screw that is physically propositioned with respect to the bimetal, permitting for a gap that represents a particular time window. Again, as in cold calibration, the hot calibration process must start with the device in the "ON" position and the trip unit charged. A percentage of the rated current, typically about 200% to about 400% is applied to the device. At this time, a clock is also started providing a running count of the time that the current has been applied to the device. When the running time approaches the calibration window at which the circuit breaker must trip (current vs. time parameter for the particular rating), the calibration screw is driven quickly towards the deflecting bimetal. Once the calibrating screw makes contact with the incoming bimetal, the device will trip and the screwdriver will not be driven any further. Once the device opens and the bimetal cools down and returns to its original stable position, there is a gap in between the bimetal and the calibration screw. Once the percentage of rated current is applied to the circuit protective phase device again, this time for the bimetal to deflect and trip, the mechanism must fall within the correct window of time set for its rating. As in cold calibration, if when tested, the time period exceeds or is below the time allowed for tripping, further adjustments to the calibration screw are required.

Both hot and cold calibration processes have a variety of parameters that must be monitored and controlled to properly calibrate the circuit protective device. For example, some of these parameters are the rate of speed at which the screw is driven, the ability to pick up the screw immediately, the forces that the driving screw and the driving tool exert on the bimetal or other acting members of the trip mechanism, bimetal flatness, electrical joint integrity due to weld process variations, and other factors.

BRIEF SUMMARY OF THE INVENTION

The present invention is directed to a calibration arrangement and calibration process for use in a circuit protective device. The calibration process of the present invention permits the operator to concentrate on achieving a particular time window for a trip of the circuit protective device, independent of most conventional variables. Consequently, the opportunity to fail will be greatly diminished. The present process is based on permitting a particular bimetal to deflect at its own rate and to travel its own distance with a fixed, predetermined percentage of current for a specific time period. The present process focuses on the distance the bimetal travels and the physical location of the bimetal at the desired time (the time window). As a result, the exact location of the trigger point for actuating the trip mechanism is determined. In an exemplary embodiment, the calibration screw is not manipulated by external forces, but instead it can remain as a loose floating member of the calibration assembly to be locked in place at predetermined time during the calibration process.

An exemplary calibration assembly for use in the calibration process of the present invention includes a split clamp arm having a first opening for receiving and holding a calibration screw and a second opening for receiving an actuator key. A portion of the split clamp arm is divided into a first arm and a second arm by a channel which extends from a first end of the split clamp arm through the first opening and communicates with the second opening. In a preferred embodiment, a first support plate is disposed against a first surface of the split clamp arm. The first support plate has a first opening axially aligned with the first opening of the split clamp arm and a second opening axially aligned with the second opening of the split clamp arm. A second support plate is disposed against a second surface of the split clamp arm. The second support plate has a first opening axially aligned with the first opening of the split clamp arm and a second opening axially aligned with the second opening of the split clamp arm.

The split clamp arm is opened by inserting and extending the actuator key through the second openings of the first and second support plates and the split clamp arm. Because of the preferred oblong or rectangular shape of the second opening of the split clamp arm, rotation of the actuator therein forces the members forming the first opening of the split clamp arm apart from one another. As a result, the calibration screw is free to float (move) within the first openings of the first and second support plates and the split clamp arm. In this open position, the calibration screw rests on the first and second side supports. The calibration screw is locked in a predetermined and desired position by simply rotating the actuator key so that the members forming the first opening converge and securely engage and hold the calibration screw in place. Accordingly, in the locked position, the calibration screw engages threads which form the first opening and thus, the calibration screw does not rest on the first and second support plates.

In yet another aspect, the present invention discloses a calibration screw for use in calibration assemblies, including the assembly of the present invention. The calibration screw preferably comprises an elongated member having a fill radius at both a first end and an opposite second end and includes a central threaded section intermediate the first and second ends. Preferably, the first and second ends have a hexagonal cross section. By having identical ends, the calibration screw permits either end of the screw to be used to pivot or drive. This simplifies the selection and feed process of the screw during an automation process.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several Figures.

DETAILED DESCRIPTION OF THE INVENTION

Figure 1:
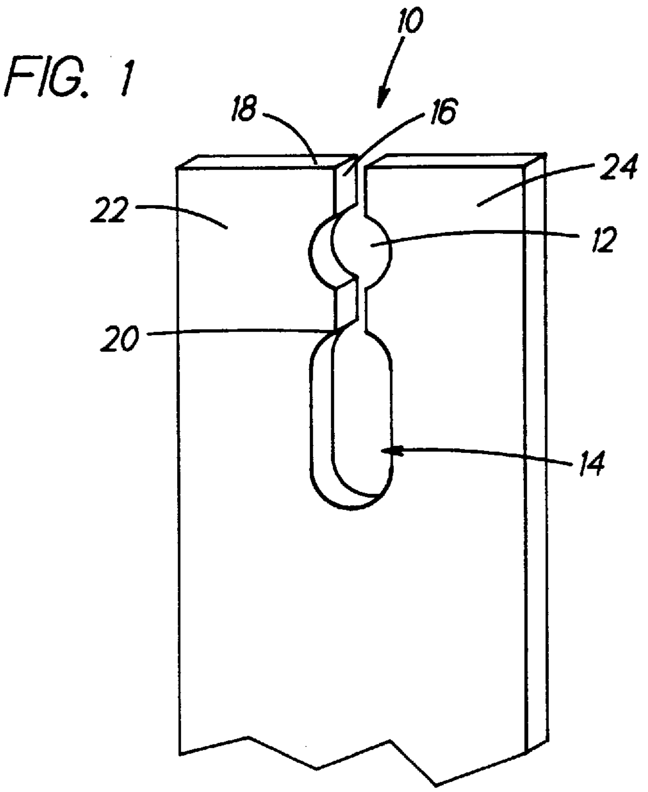
FIG. 1 is a front perspective view of a split clamp arm for use in a calibration assembly in accordance with the present invention.

Referring to FIG. 1, an exemplary split clamp arm for use in a calibration assembly of the present invention is illustrated and generally indicated at 10. Split clamp arm 10 includes a threaded split opening 12 for receiving a calibration pin, e.g., screw, 40 (shown in FIG. 3) and an elongated opening 14 for receiving a clamp actuator key 30 (shown in FIG. 2). Because clamp arm 10 is of a split nature, threaded split opening 12 and elongated opening 14 are interconnected by a channel 16 formed in split clamp arm 10. Channel 16 extends from a first end 18 to a second end 20 which opens into elongated opening 14. Intermediate first and second ends 18 and 20 is threaded split hole 12. As shown in FIG. 1, threaded split opening 12, elongated opening 14, and channel 16 are preferably centrally located in split clamp arm 10 so that channel 16 generally divides split clamp arm 10 into a first side 22 and a second side 24. Because of the split nature of split clamp arm 10, the gap between first side arm 22 and second side arm 24, which is defined by channel 16, threaded split hole 12 and elongated opening 14, is designed to be either increased or decreased by using actuator key 30, as will be described in greater detail hereinafter. In other words, split clamp arm 10 has an open position in which first and second side arms 22 and 24 are forced away from one another and a closed position which is illustrated in FIG. 1. Split clamp arm 10 may be formed of any suitable material and in one embodiment is formed of a metal.

Figure 2:
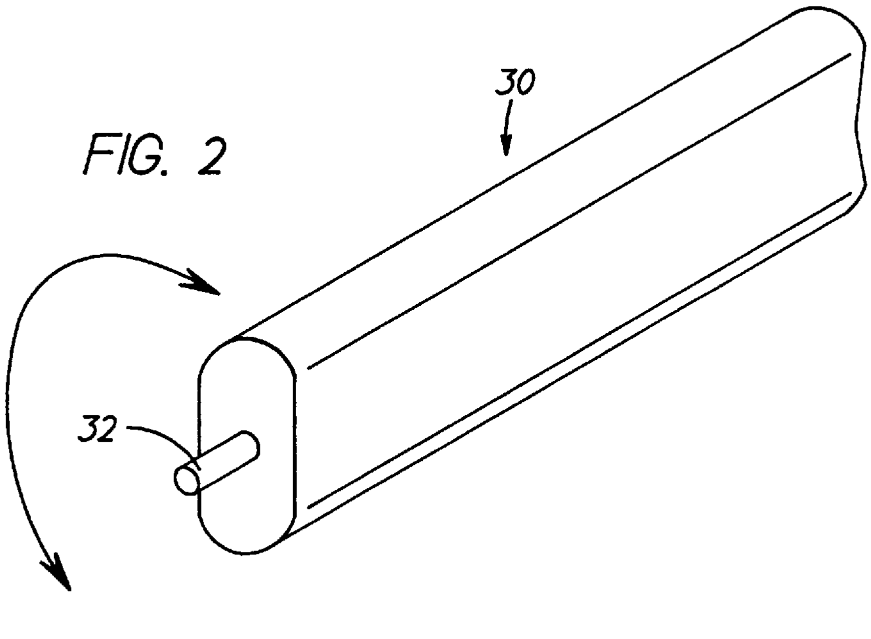
FIG. 2 is a partial front perspective view of an actuator key.

FIG. 2 shows an exemplary actuator key 30 for use with split clamp arm 10 of the present invention. Actuator key 30 comprises an elongated member with an oblong or rectangular cross section, as shown. Actuator key 30 includes first and second ends, wherein a pin 32 projects from at least one of the first and second ends. Actuator key 30 is received in elongated opening 14 by vertically aligning actuator key 30 with elongated opening 14 so that actuator key 30 is received therein. Accordingly, actuator key 30 and elongated opening 14 have complementary shapes and dimensions. Pin 32 acts as a guide or bearing and thus, pin 32 helps a user insert and remove actuator key 30 from split clamp arm 10 and more importantly, pin 32 is designed to be received in a rotator (not shown) which upon actuation, rotates pin 32 and consequently rotates actuator key 30. Exemplary rotating devices include but are not limited to a stepping motor apparatus, servomotor, and a pneumatic rotator, to name a few.

With reference to FIGS. 1 and 2, split clamp arm 10 is actuated to the open position by inserting actuator key 30 into elongated opening 14. Once actuator key 30 is disposed within elongated opening 14, actuator key 30 is rotated to cause split clamp arm 10 to go from the closed position to the open position. More specifically, once actuator key 30 is disposed in elongated opening 14, actuator key 30 can be preferably rotated about 90° and because of its oblong or rectangular design, actuator key 30 forces first and second side arms 22 and 24 away from each other. When first and second side arms 22 and 24 open, split clamp arm 10 is in the open position. In this open position, threaded split opening 12 is likewise opened because threaded split opening 12 is generally defined by first and second side arms 22 and 24. When threaded split opening 12 is opened, calibration screw 40 (FIG. 3) is released and sits free within opened threaded split opening 12.

Figure 3:
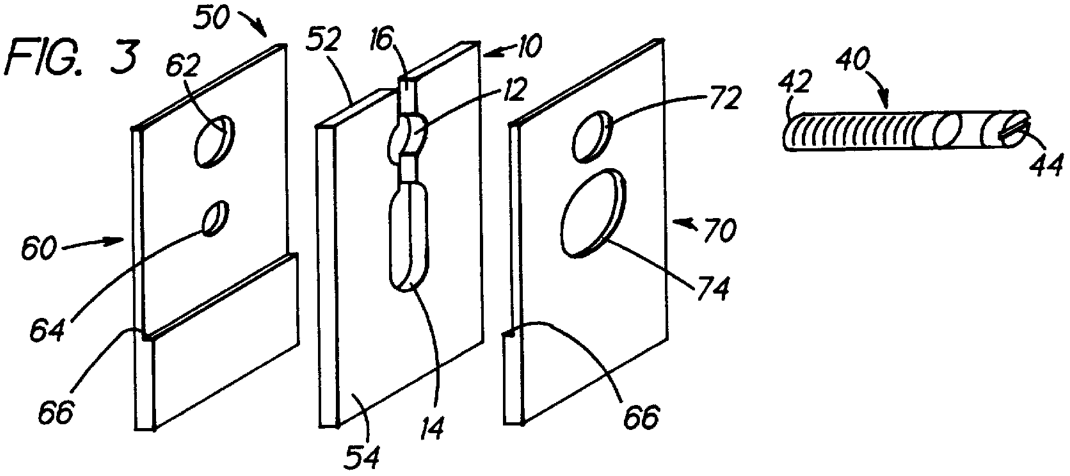
FIG. 3 is an exploded front perspective view of the exemplary calibration assembly of the present invention.

FIG. 3 shows an exemplary calibration assembly 50 of the present invention. Calibration assembly 50 comprises split clamp arm 10, a first support plate 60, a second support plate 70, and calibration screw 40. In one embodiment, as shown in FIG. 3, calibration screw 40 comprises a conventional calibration screw having a rounded end 42 at one end that serves as a pivot point, and a drive feature 44 such as a slot or socket at the other end to allow calibration screw 40 to be manipulated. Split clamp arm 10 includes a first surface 52 and an opposing second surface 54, wherein first support plate 60 is disposed against first surface 52 and second support plate 70 is disposed against second surface 54.

First and second support plates 60 and 70 serve a dual function. First, support plates 60 and 70 support calibration screw 40 when split clamp arm 10 is in an open, unclamped position. In this position, calibration screw 40 is kept away from thread interference and is permitted to have free motion within split clamp arm 10. In other words in the open position, calibration screw 40 rests on first and second support plates 60 and 70. Second, support plates 60 and 70 provide for the location and bearing for actuator key 30. First support plate 60 includes a first opening 62 and a second opening 64. First opening 62 is axially aligned with threaded split opening 12 when first support plate 60 is disposed against first surface 52 of split clamp arm 10 and is designed to receive one end of calibration screw 40 when calibration screw 40 extends through threaded split opening 12. First opening 62 is of a diameter larger than a major diameter of calibration screw 40 to permit calibration screw 40 to freely pass through first support plate 60 when split clamp arm 10 is in both the open and closed positions.

Second opening 64 of first support plate 60 is axially aligned with elongated opening 14 when first support plate 60 is disposed against first surface 52 of split clamp arm 10. Second opening 64 acts as a bearing or locating point for actuator key 30 and because the diameter of second opening 64 is less than the width of elongated opening 14, the placement of one end of actuator key 30 through second opening 64 properly locates and positions actuator key 30 within calibration assembly 50.

Figure 9:
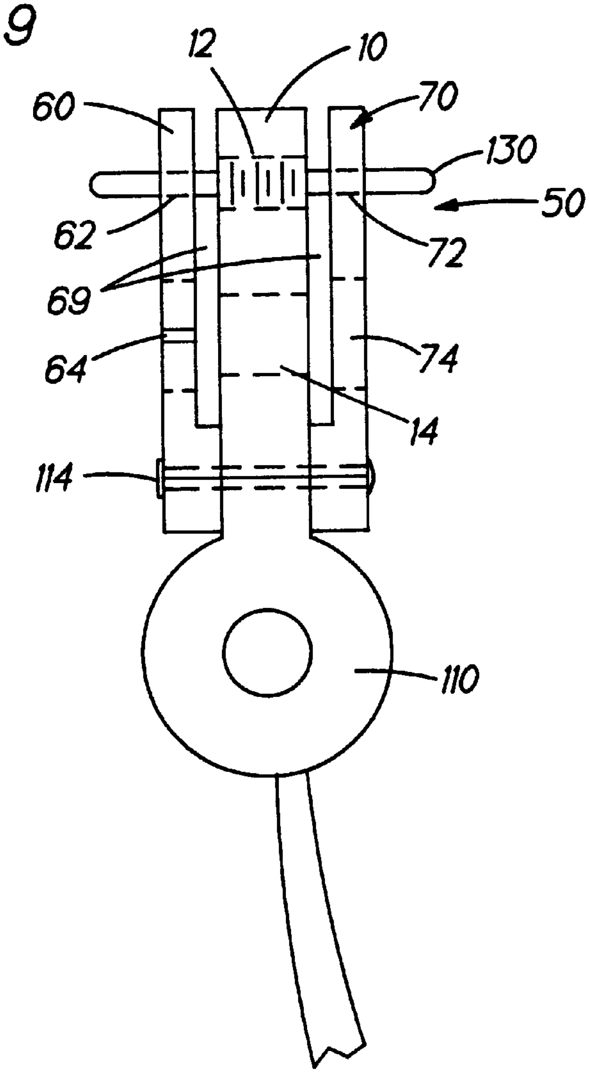
FIG. 9 is a top plan view of a calibration assembly including the calibration screw of FIG. 8, wherein the split clamp arm of FIG. 3 is integral to a circuit protective device trip arm.

Second support plate 70 is similar to first support plate 60 in that second support plate 70 is intended to be disposed against second surface 54 of split clamp arm 10 in calibration assembly 50 of the present invention. Second support plate 70 includes a first opening 72 which receives calibration screw 40. First opening 72 is preferably of a greater diameter than both the diameter of threaded split opening 12 and the major diameter of calibration screw 40. Also formed in second support plate 70 is a second opening 74 which receives actuator key 30. Second opening 74 is axially aligned with both elongated opening 14 of split clamp arm 10 and second opening 64 of first support plate 60 so that actuator key 30 passes therethrough during operation of calibration assembly 50 of the present invention. Second opening 74 preferably is oversized and has a diameter greater than the width of elongated opening 14 so that second opening 74 acts as a clearance opening for actuator key 30. Because second opening 64 is undersized in relation to elongated opening 14 and second opening 74, second opening 64 serves to centrally locate actuator key 30 with openings 14 and 74. First and second support plates 60 and 70 each include a lip 66 formed in opposing surfaces thereof which abut split clamp arm 10. As best shown in FIG. 9, lips 66 form openings 69 which are disposed between split clamp arm 10 and first and second support plates 60 and 70 in the fully assembled state shown. Lips 66 serve to space split clamp arm 10 away from first and second support plates 60 and 70 to permit free motion of split clamp arm 10.

Figure 11:
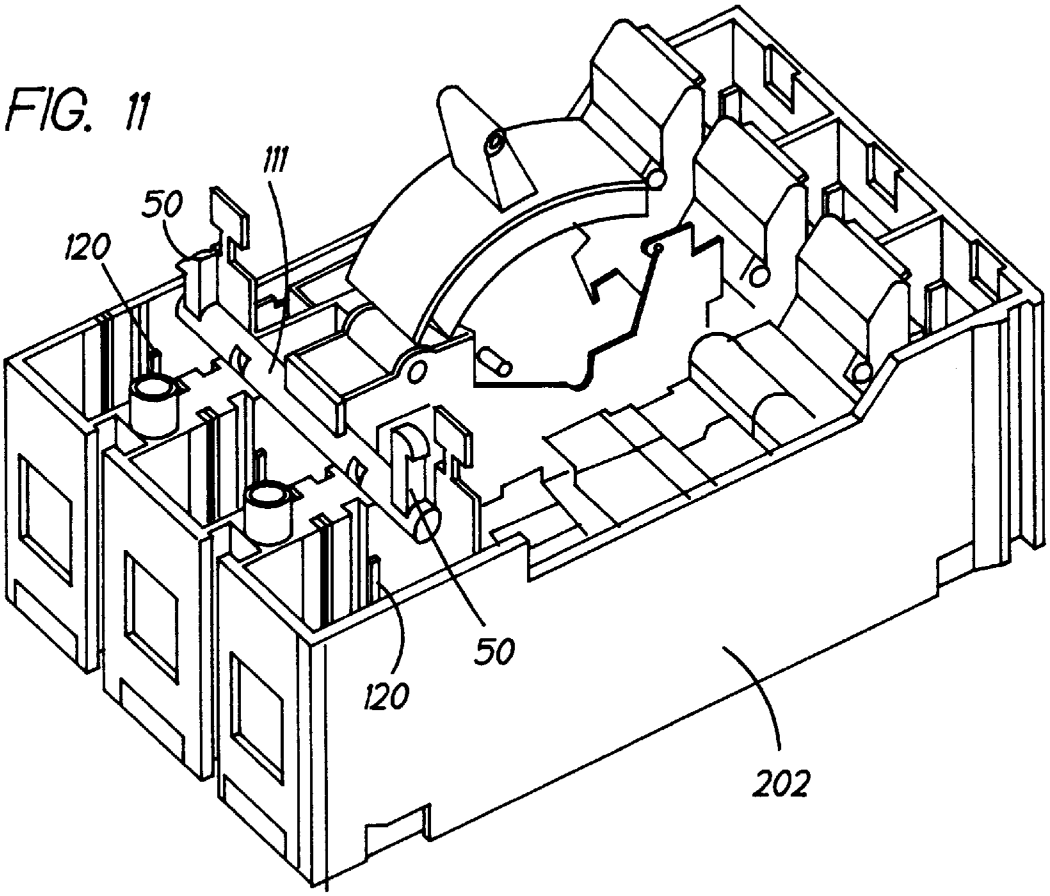
FIG. 11 is front perspective view of an exemplary circuit protective device in which the calibration assembly of FIG. 3 is utilized.
Figure 12:
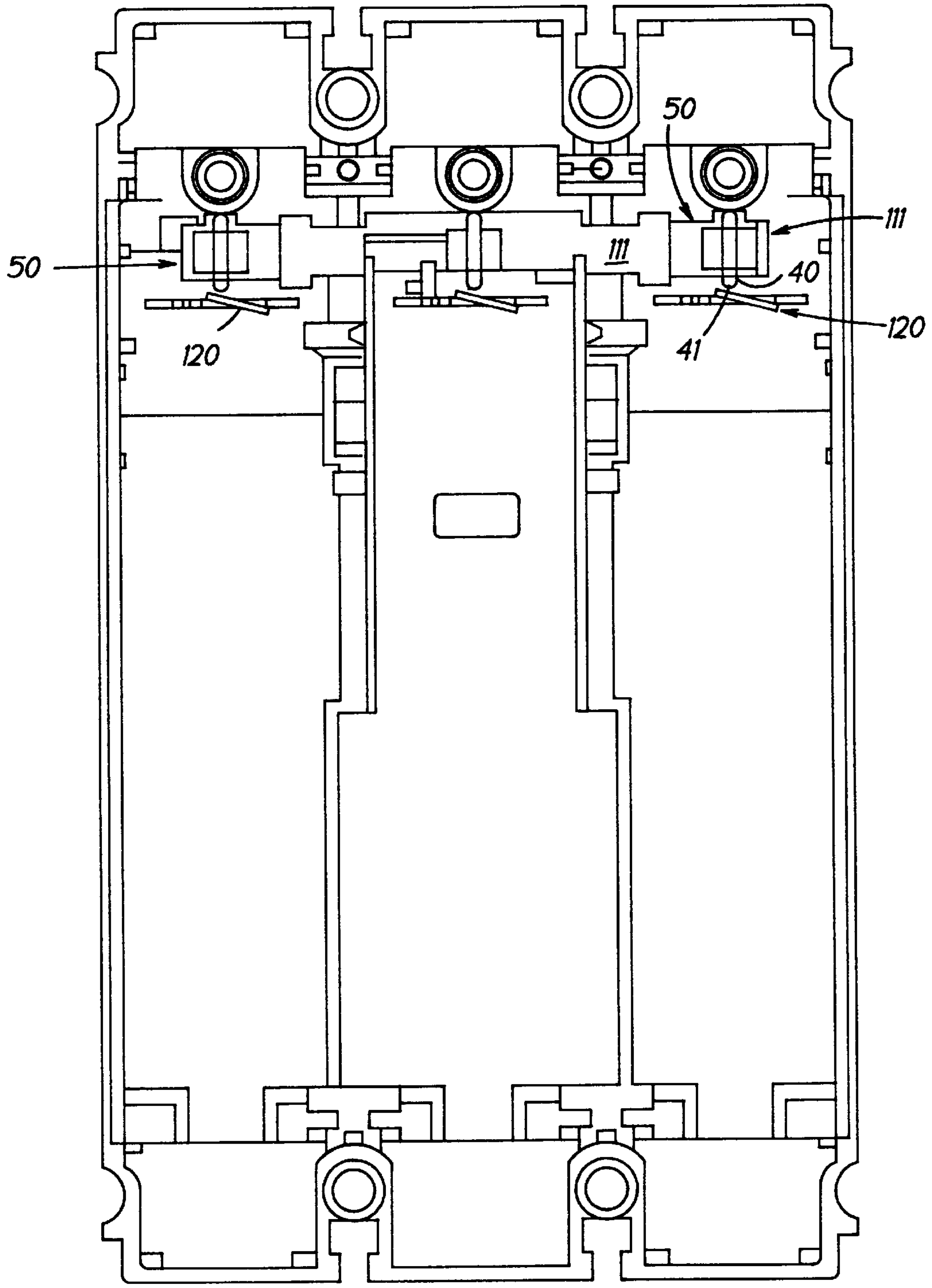
FIG. 12 is a top planar view of the circuit protective device of FIG. 11 showing the calibration assembly of the present invention.

Split clamp arm 10 can be attached to or be a part of a trip mechanism (as shown in FIG. 9) of a circuit protective device (shown in FIGS. 11 and 12). The operation of calibration assembly 50 is as follows. In the initial open position of split clamp arm 10, actuator key 30 is placed in second opening 74 and is passed through elongated opening 14 and second opening 64. Actuator key 30 is rotated by rotation means including but not limited to stepping motors, pneumatic motors, and the like. Actuator key 30 is preferably rotated about 90° to open split clamp arm 10 by forcing first and second side arms 22 and 24 to open. In this open position, calibration screw 40 is freely inserted into first opening 74 and extends through threaded split opening 12 and first opening 64. Because first and second side arms 22 and 24 are open in relation to one another, calibration screw 40 is not secured within split clamp arm 10 and thus movement is possible.

Figure 10:
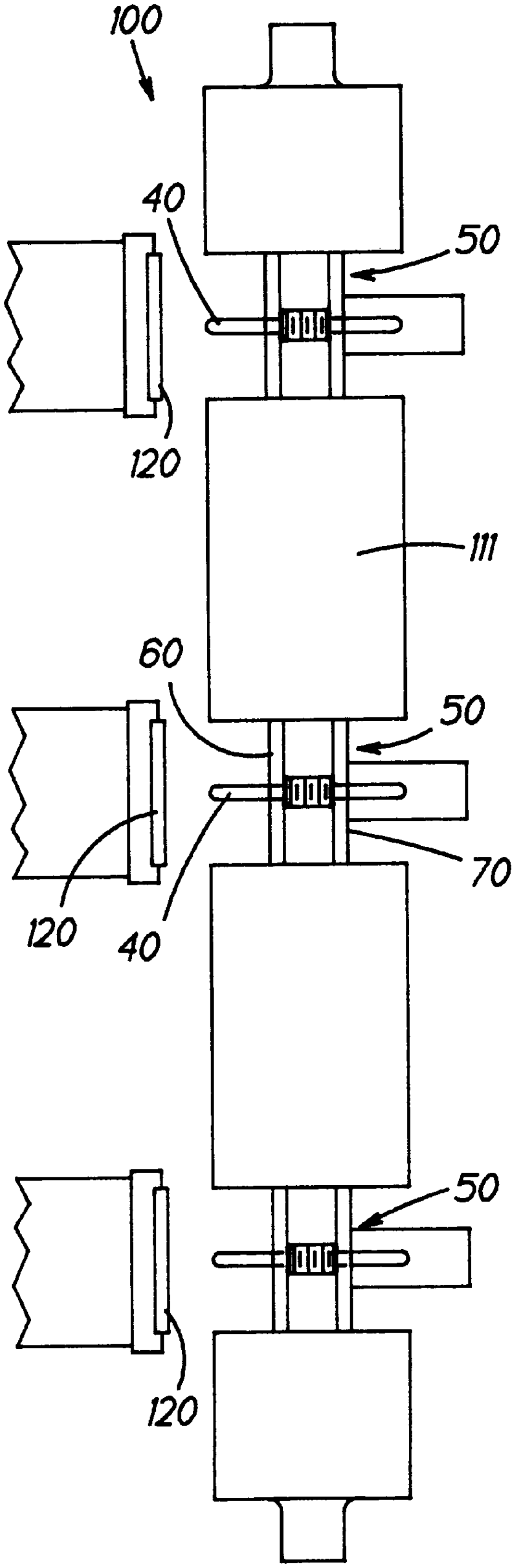
FIG. 10 is a top plan view of the calibration assembly of FIG. 3 in a three pole circuit protective device.

After positioning calibration screw 40 at a predetermined position in relation to split clamp arm 10, calibration screw 40 is locked into place by rotating actuator key 30 preferably about 90° so that first and second side walls 22 and 24 move toward one another and a threaded portion thereof (which forms threaded split opening 12), engages calibration screw 40 and locks it into place. In this closed position, calibration screw 40 engages the threads of threaded split opening 12 and does not rest on first and second support plates 60 and 70. Once calibration screw 40 is locked in place, actuator key 30 may be removed from calibration assembly 50. As shown in FIG. 10, calibration assembly 50 of the present invention may be used in multiple pole assembly, such as assembly 100 shown in FIG. 10. Assembly 100 comprises a multi-pole device and in this exemplary embodiment, assembly 100 is a three pole circuit protective device.

Now turning to FIGS. 4–7 which illustrate a process of calibrating circuit protective device 200 (FIGS. 11 and 12). Calibrating assembly 50 of the present invention provides for an improved process of hot calibration in which calibration screw 40 is accurately positioned to create an optimum trip window. Calibration assembly 50 shown in FIGS. 4–7 is one in which split clamp arm 10 is integrally formed with a trip arm which is generally indicated at 110. Split clamp arm 10 is intermediate first and second support plates 60 and 70. Also shown is a conventional bimetal 120, the use of which is well known in the art. In a first position shown in FIG. 4, split clamp arm 10 is in an open position, wherein calibration screw 40 is free to move. In this position, actuator key 30 (not shown) has been inserted and rotated to open split clamp arm 10. Bimetal 120 is in a relaxed state. One end 41 of calibration screw 40 is proximate bimetal 120. Because calibration screw 40 is free to move, it is in effect a floating member within split clamp arm 10.

Figure 5:
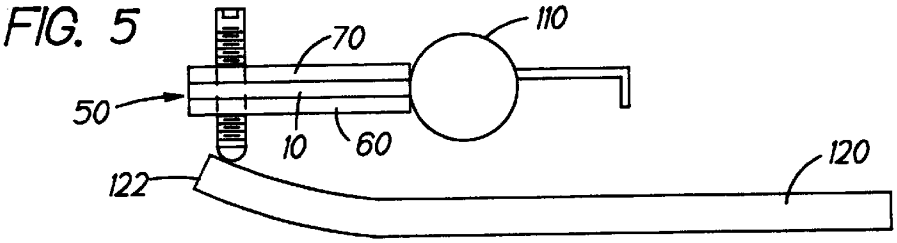
FIG. 5 shows the calibration assembly of FIG. 3 in a second position during the calibration process of the present invention.

FIG. 5 shows a second position where bimetal 120 is deflected by heat. Typically, the applying of heat results from applying a predetermined rated current of the circuit protective device across bimetal 120. As bimetal 120 is deflected by heat, a first end 122 of bimetal 120 deflects in a first direction toward end 41 of calibration screw 40. As deflected first end 122 contacts end 41 and continues to deflect in the first direction, calibration screw 40 is driven also in the first direction (shown by the arrow) away from bimetal 120 to a trip position. A calibration apparatus (not shown) which monitors the calibration process has stored information so that for any given rating current, a time window can be calculated. The time window is the amount of time after the predetermined current has been applied to the circuit protective device that should elapse prior to the trip mechanism actuating to cause interruption in the current flow at a predetermined point in time. Once this predetermined time point is reached, the rotator (not shown) is actuated to cause rotation of actuator key 30. Accordingly, this results in the closing of the threads forming threaded split opening 12 so that calibration screw 40 is engaged by the threads and is locked in position.

Figure 6:
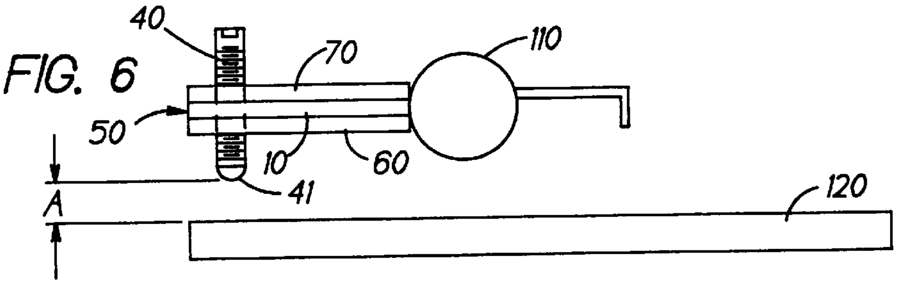
FIG. 6 shows the calibration assembly of FIG. 3 in a third position during the calibration process of the present invention.

FIG. 6 shows calibration assembly 50 once bimetal 120 is cooled down (eliminating the deflection thereof) and split clamp arm 10 is in the closed position locking calibration screw 40 in place. Thus, calibration screw 40 is not free to move within split clamp arm 10 and in relation to bimetal 120. Calibration screw 40 remains in the trip position. As shown, the gap between end 41 of calibration screw 40 and bimetal 120 has widened in comparison to the position thereof in FIG. 4. The gap between end 41 and bimetal 120 is referred to as a calibration or trip gap and is generally indicated as distance A in FIG. 6.

Figure 7:
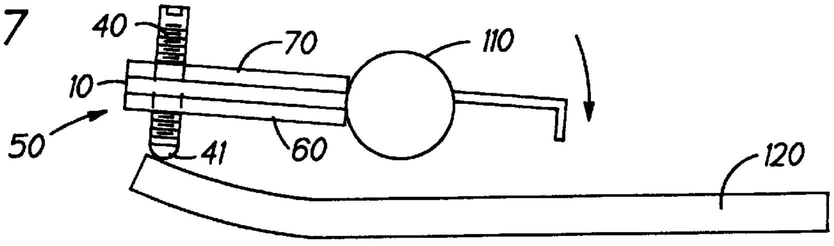
FIG. 7 shows the calibration assembly of FIG. 3 in a fourth position during the calibration process of the present invention.

FIG. 7 shows the heating of bimetal 120 by applying the predetermined rated current. Unlike the heating of bimetal 120 described in relation to FIG. 4, calibration screw 40 is locked in place and the trip gap exists. Bimetal 120 deflects under the application of the predetermined rated current and continues to deflect in the first direction. Bimetal 120 will contact end 41 of calibration screw 40 and because it is not a floating calibration screw anymore, the contacting and driving of calibration screw 40 forces trip arm 110 into the thermal calibration and acceptance band. In other words, the driving of calibration screw 40 results in trip arm 110 actuating the trip mechanism of the circuit protective device. As a result of the reapplication of the rated current on bimetal 120, the deflection thereof and actuation of the trip mechanism should take the same amount of time as previously measured (the trip window) if the circuit breaker is properly calibrated. If the trip mechanism is not actuated at the elapse of the trip time for the predetermined rated current, the calibration is inaccurate and should redone.

The calibration process of the present invention provides for a trip unit assembly that requires minimum interference of forces external to the circuit protective device (i.e., noise) during the calibration process. During the present calibration process, calibration screw 40 is driven in or out by forces external to the circuit protective device. This in or out screw transition is designed to "tune in" the distance allowed for bimetal 120 to travel before tripping the circuit protective device. Calibration screw 40 is not manipulated by external forces, but instead it can remain as a loose member of the assembly to be locked in place at a predetermined time. Accordingly, the deficiencies of calibration processes of the prior art are overcome by the calibration process of the present invention.

Figure 8:
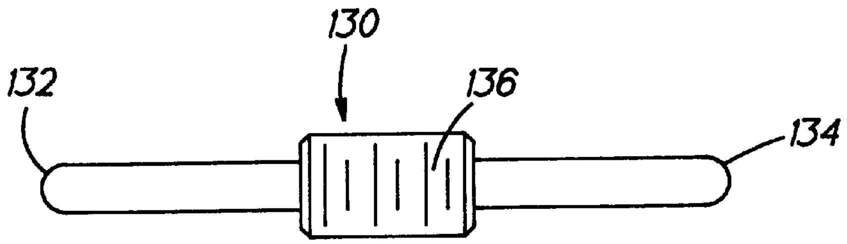
FIG. 8 is a front elevation view of an exemplary calibration screw.

FIG. 8 shows another aspect of the present invention. A calibration screw 130 is presented and is intended for use in calibration assembly 50 of the present invention. Calibration screw 130 permits both a first end 132 and an opposite second end 134 to be identical and therefore, provides the capability to either first or second ends 132, 134 to be used to pivot or drive calibration screw 130. This greatly simplifies the selection and feed process of the screw during a typical automation process. Calibration screw 130 has two full radius at first and second ends 132 and 134. This full radius provides multiple advantages at each end of calibration screw 130. At one of ends 132 and 134, the radius provides for a good bearing surface for the screw to be slid or be pushed against with compound forces. This allows for low friction movement of other components against calibration screw 130. At the other of ends 132 and 134, the same radius provides the necessary lead for a tool, such as a socket, to reliably pick-up calibration screw 130. It is a very common problem that screw pick-up during calibration processes of the prior art is problematic, and the two full radius design of calibration screw 130 of the present invention will greatly alleviate or eliminate these problems.

Intermediate first and second ends 132 and 134, calibration screw 130 has a threaded section 136 which is complementary to and intended to threadingly engage threaded split opening 12 of split clamp arm 10. Typically, threaded section 136 comprises finer type threads to permit finer control of calibration distances. In addition, calibration screw 130 has at each of ends 132 and 134 a drive feature. In an exemplary embodiment, this driving feature is a standard male six point (hexagon). This male hexagon shape is preferred because it permits ease of pick-up, especially when using a 12 point socket tool. The length of the hex drive need not to be excessive, but it can be determined by the particular application of the calibration screw 130. Furthermore, the distance from flat to flat on the hex drive and the thread of the screw can be determined by the particular application.

Figure 4:
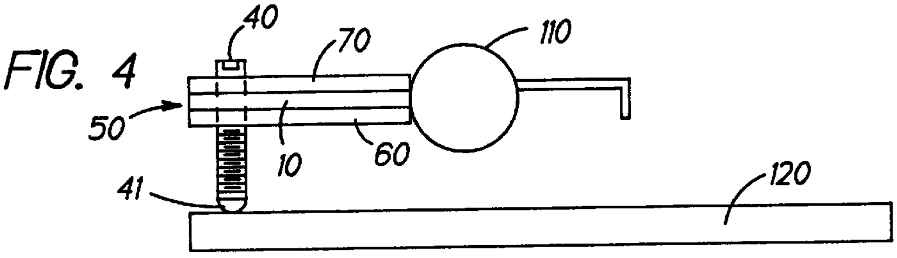
FIG. 4 shows the calibration assembly of FIG. 3 in a first position during a calibration process of the present invention.

FIG. 9 is a cross sectional view of calibration assembly 50 of FIG. 4 including calibration screw 130. In this embodiment, split clamp arm 10 is integrally formed with trip arm 110 of an exemplary circuit protective device. More specifically, split clamp arm 10 forms one end of trip arm 110 and a second end extends to a suitable trip mechanism which serves to separate moveable contacts upon mechanical movement of trip arm 110. Also shown is a fastener 114 which couples split clamp arm 10 and first and second support plates 60 and 70 in their desired relationship to one another, wherein split clamp arm 10 is intermediate first and second support plates 60 and 70. Fastener 114 may comprise suitable fasteners known in the art and in an exemplary embodiment comprises one of a rivet, weld, screw, and the like. Fastener 114 secures an end of calibration assembly 50 which is opposite the end including calibration screw 130 extending through first opening 62 , threaded split opening 12, and first opening 72. FIG. 10 shows a partial assembly for a multi-pole circuit protective assembly 100 including a common trip bar 111 which includes three separate calibration assemblies 50, wherein split clamp arm 10 for each of the assemblies is integrally formed with common trip bar 111. Assembly 100 further includes three bimetals 120 each of which corresponds to one of calibration assemblies 50. Advantageously, the present invention greatly facilitates the calibration procedure in multiple pole devices, such as assembly 100, by permitting individual setting of each of the poles. This provides for greater diversity among the settings and increased accuracy.

FIGS. 11 and 12 show a suitable multiple pole circuit protective device 200. In one exemplary embodiment and as shown, device 200 is a three pole device having three calibration assemblies 50, one for each of the three poles. Device 200 includes common multi-pole trip bar 111 which extends between a housing 202 of device 200. In this embodiment, common multi-pole trip bar 111 includes calibration assemblies 50 which are spaced along the length of trip bar 111. Proximate calibration assemblies 50 are corresponding bimetals 120, wherein there is a single bimetal 120 for each of calibration assemblies 50. FIG. 12 is a top plan view of device 200 showing the placement of trip bar 111 and calibration assemblies 50 in relation to bimetals 120. As shown, calibration assembly 50 has been calibrated resulting in a gap between end 41 of calibration screw 40 and bimetal 120. As previously described, once the predetermined rated current flows along bimetal 120, heat is generated and this heat causes bimetal 120 to deflect in the first direction toward end 41 of calibration screw 40. Because calibration screw 40 is in the locked position within split clamp arm 10, the driving of calibration screw 40 by bimetal 120 causes displacement of common trip bar 111. Because common trip bar 111 is a part of the trip mechanism for circuit protective device 200, the displacement thereof actuates the trip mechanism and causes contacts to separate and interrupt the flow of current.

The present calibration process is directed to setting an optimum relative position of the deflecting bimetal 120, at a predetermined percentage of current and for a predetermined time period, to the trip unit trigger (which in this case is calibration screw 40). The present calibration process permits for some parameters to be set, such as the percentage and the time permitted before starting movement of calibration screw 40, but there are many other parameters (variables) in the process that are not controlled and that directly affect the yield. For example, some of these variables include the rate of speed at which the calibration screw is driven, the ability to stop the turning of the calibration screw once the unit has tripped, the ability to pick up the calibration screw immediately, the forces that the driving screw and the driver tool exert on the bimetal or other acting members of the trip mechanism, bimetal flatness, electrical joint integrity due to the welding process, and other factors. In contrast, the calibration process of the present invention permits the operator to concentrate on achieving a particular time window for a trip of circuit protective device 200, independent of most of the variables. Consequently, the opportunity to fail will be greatly diminished. The present process is based on permitting a particular bimetal 120 to deflect at its own rate and to travel its own distance with a fixed, predetermined percentage of current for a specific time period. The present process focuses on the distance that bimetal 120 travels and the physical location of bimetal 120 at the desired time. As a result, the exact location of the trigger point for actuating the trip mechanism is determined. Advantageously, all of the above-mentioned other variables are essentially ignored because bimetal 120 deflects to a certain dimension using time versus heat, and as a result, the principal variable becomes the trip force.

While preferred embodiments have been shown and described, various modifications and substitutions may be made thereto without departing from the spirit and scope of the invention. Accordingly, it is understood that the present invention has been described by way of illustrations and not limitation.

What is claimed is:

1. A split clamp arm for use in a calibration assembly of a circuit protective device comprising:

a calibration pin;

a plate having a first end and an opposite second end, the plate including a first opening for receiving and holding the calibration pin and a second opening for receiving an actuator key, wherein a portion of the plate is divided into a first arm and a second arm by a channel which extends from the first end through the first opening and communicates with the second opening.

2. A calibration assembly for use in a circuit protective device comprising:

a calibration pin;

a split clamp arm having a first end and an opposite second end, the split clamp arm including a first opening for receiving and holding the calibration pin and a second opening for receiving an actuator key, wherein a portion of the split clamp arm is divided into a first arm and a second arm by a channel which extends from the first end through the first opening and communicates with the second opening;

a first support plate disposed against a first surface of the split clamp arm, the first support plate having a first opening axially aligned with the first opening of the split clamp arm and a second opening axially aligned with the second opening of the split clamp arm; and a second support plate disposed against a second surface of the split clamp arm, the second support plate having a first opening axially aligned with the first opening of the split clamp arm and a second opening axially aligned with the second opening of the split clamp arm.

3. The calibration assembly of claim 2, wherein the first opening of the split clamp arm includes threads for securing the calibration spin.

4. The calibration assembly of claim 2, wherein the second opening of the split clamp arm has an oblong or rectangular shape.

5. The calibration assembly of claim 2, wherein the calibration pin comprises:

an elongated member having a full radius at a first end and an opposite second end and a central threaded section.

6. The calibration assembly of claim 5, wherein the first and second ends have a hexagonal cross section.

7. The calibration assembly of claim 2, wherein the second end of the split clamp arm is integrally formed as part of a trip bar of a trip unit of the circuit protective device.

8. The calibration assembly of claim 2, wherein the actuator key comprises an elongated member having an oblong cross section so that rotation of the actuator within the second opening of the split clamp arm forces the first and second side arms apart from one another.

9. A process of calibration for a circuit protective device having a bimetal for sensing current and a trip arm which causes actuation of a trip mechanism to interrupt current flow in the circuit protective device, comprising:

providing a calibration assembly having a split clamp arm including a first end and an opposite second end, the split clamp arm including a first opening for receiving and holding a calibration pin and a second opening for receiving an actuator key, wherein a portion of the plate is divided into a first arm and a second arm by a channel which extends from the first end through the first opening and communicated with the second opening, the calibration assembly being proximate the bimetal;

inserting and rotating the actuator key within the second opening so that the first and second arms are forced apart from one another;

inserting the calibration pin within the first opening, the calibration pin being free to move within the first opening; and applying a predetermined amount of heat to the bimetal so that at least one end of the bimetal deflects and drives the calibration pin in a direction away from the bimetal in a first period of time.

10. The process of claim 9, further including:

restoring the bimetal to a generally planar condition;

rotating the actuator key so that the first and second arms converge to lock the calibration pin within the first opening; and reapplying the predetermined amount of heat to the bimetal so that the bimetal deflects and contacts the calibration pin in the first period of time.

11. The process of claim 9, wherein applying the predetermined amount of heat to the bimetal comprises applying a predetermined rated current to the bimetal.

12. The process of claim 9, further comprising:

disposing a first support plate against a first surface of the split clamp arm, the first support plate having a first opening axially aligned with the first opening of the split clamp arm and a second opening axially aligned with the second opening of the split clamp arm; and disposing a second support plate against a second surface of the split clamp arm, the second support plate having a first opening axially aligned with the first opening of the split clamp arm and a second opening axially aligned with the second opening of the split clamp arm.

13. A process of calibration for a circuit protective device having a calibration assembly including a calibration pin held in place within a first opening formed in a split clamp ann, a bimetal proximate to the calibration assembly for sensing current, and a trip arm which causes actuation of a trip mechanism to interrupt current flow in the circuit protective device, comprising:

opening the split clamp arm so that the calibration pin is free to move within a first opening formed therein;

deflecting the bimetal so that the bimetal travels a predetermined first distance in a predetermined first time period and drives the calibration pin; and locking the split clamp arm so that the calibration pin is secured within the first opening.

14. The process of claim 13, further including:

restoring the bimetal to a non-deflected state; and deflecting the bimetal so that the bimetal travels the first predetermined distance and contacts and drives the calibration pin in the first predetermined time period.

15. The process of claim 13, wherein opening the spit clamp arm comprises inserting an actuator key in a second opening formed in the split clamp arm and rotating the actuator key so that the diameter of the first opening increases resulting in the calibration screw being free to move.

16. The process of claim 15, wherein locking the split clamp arm comprises rotating the actuator key.

17. The process of claim 15, wherein deflecting the bimetal comprises applying a predetermined rated current thereto.

* * * * *

UNITED STATES PATENT AND TRADEMARK OFFICE

CERTIFICATE OF CORRECTION

PATENT NO. : 6,104,273

DATED : August 15, 2000
INVENTOR(S) : Javier Larranaga et al.

It is certified that error appears in the above-identified patent and that said Letters Patent is hereby corrected as shown below:

<u>Column 1,</u>
Line 66, after “calibration” delete “s”

<u>Column 3,</u>
Line 14, after “at” insert -- a --
Line 55, after “a” delete “fill” and insert therefor -- full --

<u>Column 8,</u>
Line 3, after “should” insert -- be --

<u>Column 12,</u>
Line 27, after “the” (second occurrence) delete “spit” and insert therefor -- split --

Signed and Sealed this

Thirtieth Day of July, 2002

*Attest:*

JAMES E. ROGAN

*Attesting Officer*

*Director of the United States Patent and Trademark Office*